Patented Sept. 22, 1953

2,653,168

UNITED STATES PATENT OFFICE 2,653,168

PROCESS FOR PREPARING FUMARYL CHLORIDE

Sydney M. Spatz, Middletown, N. Y., assignor to Allied Chemical & Dye Corporation, New York, N. Y., a corporation of New York No Drawing. Application October 6, 1950, Serial No. 188,870

8 Claims. (Cl. 260—544)

This invention relates to a process for preparing fumaryl chloride, and more particularly, to a process for preparing fumaryl chloride in higher yields than have heretofore been obtained.

One well known method of preparing acid chlorides of saturated carboxylic acids consists in treating the acid with thionyl chloride in the presence or absence of an inert solvent. Attempts to prepare the acyl chlorides of unsaturated dibasic acids by such a procedure have been largely unsuccessful. In the case of maleic acid, treatment with thionyl chloride has resulted in the formation of maleic anhydride, and, in the case of fumaric acid, such treatment has resulted either in no reaction at all, or in an incomplete reaction with insignificant yields of fumaryl chloride.

Fumaryl chloride is a highly reactive simple derivative of fumaric acid and is useful as an intermediate in the preparation of dyestuffs, pharmaceuticals and synthetic organic chemicals.

It is an object of the present invention to provide a process for preparing fumaryl chloride.

It is a further object to provide a process for preparing fumaryl chloride in higher yields than have heretofore been obtained.

These and other objects are accomplished according to my invention wherein fumaric acid and thionyl chloride are caused to react in the presence of a reaction promoter of the class of iron and compounds thereof.

The reaction according to my invention is illustrated below.

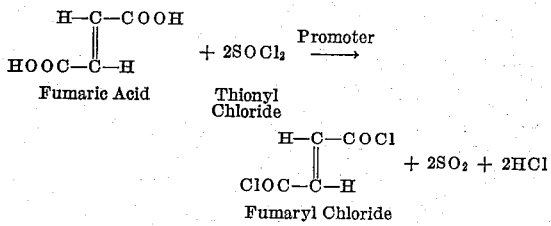

In carrying out the process of my invention, fumaric acid, thionyl chloride, and the desired reaction promoter are mixed in any suitable manner, preferably in a vessel equipped with a reflux condenser to provide for condensation and return of the thionyl chloride and escape of hydrogen chloride and sulfur dioxide generated in the reaction. The mixture is heated to reflux temperature and this temperature is maintained, preferably by heating under reflux- ing conditions until the reaction appears to be complete, usually in approximately 2 to 24 hours. The completion of the reaction may conveniently be observed by the disappearance of the solid fumaric acid from the reaction mixture. After completion of the reaction, the fumaryl chloride thus produced may be recovered in any desired manner, suitably by fractional distillation under atmospheric pressure. Because fumaryl chloride is a powerful vesicant and lachrymator, difficulty has been experienced in determining the precise boiling point of the pure compound. The boiling point is variously given in the literature as 158° to 160° C. (Auwers), 160° (Kekule) and 161° to 164° C. (Perkin) and specific gravity 1.415. (Beilstein 4th edition, volume 2, page 743, first supplement, page 302; Heilbron, Dictionary of Organic Compounds, volume 2, pages 90 and 91.) In general, however, the material which distills in the range from about 153° to 170° C. is essentially fumaryl chloride. Additional product which is essentially fumaryl chloride may be recovered by refractionating other fractions, and collecting the distillate boiling between 153° and 170° C. The total amount of material which is essentially fumaryl chloride and recoverable in this manner ranges from around 70% to nearly 100% of the yield of fumaryl chloride possible theoretically from the charge of fumaric acid.

The promoters which are useful as reaction assistants in my process are iron in metallic form and compounds of iron. The iron compounds used may be the various oxides, or salts of iron in any of their various valence states with acids, preferably non-oxidizing acids, or other compounds of iron, such as ferric chloride, ferrous chloride, hydrated ferrous sulfate, ferrous and ferric bromides, -iodides, -oxides and hydroxides, ferric orthophosphate, ferric sulfate, ferric acetate, ferric fumarate, ferric oxalate, iron phthalocyanine, sodium ferrocyanide, and the like.

The promoter substances of the class described above stimulate the reaction between thionyl chloride and fumaric acid to form fumaryl chloride, but they do not promote a similar conversion of maleic acid to maleyl chloride.

The amount of thionyl chloride used should not be materially less than 2½ mols per mol of fumaric acid and I prefer to use from 2½ to about 6½ mols of thionyl chloride per mol of fumaric acid. Larger proportions of thionyl chloride may be used if desired. Inert solvents may be used in the reaction mixture, if desired, for example, benzene, toluene, etc., but in general this is not essential since the thionyl chloride is a solvent for the fumaryl chloride and the presence of an inert solvent acts to slow the reaction somewhat by lowering the concentration of thionyl chloride.

The metal, or the portion thereof in a promoter compound of the metal, appears to be responsible for the promoting action; and the amount of the metal which effects a desirable reaction in a fumaric acid-thionyl chloride mixture need not, and preferably does not exceed one percent of the weight of fumaric acid initially in the reacting mixture. In general, it appears that there is a threshold ratio between the amount of metal which effects a noticeable stimulation of reaction and the amount of fumaric acid in the reacting mass. Thus, I have found that the threshold amount appears to be between 0.013 and 0.016 part by weight of iron per 100 parts by weight of fumaric acid, as indicated in Table I.

Table I

| Mol Ratio of Thionyl Chloride/Fumaric Acid | Fe Content as Fe per 100 parts Fumaric Acid | Reaction Time, Hours | Yield of Fumaryl Chloride (Percent) |
| --- | --- | --- | --- |
| 6.25 | 0.0097–0.013 | 28.5 | 0 |
| 6.25 | 0.0097–0.013 | 61 | 0 |
| 6.6 | 0.016– | 10.5 | 92.4 |
| 5 | 0.018 –0.021 | 20.5 | 91 |
| 6.25 | 0.023 –0.026 | 17.5 | 96.4 |
| 6.25 | 0.023 –0.026 | 20.5 | 93 |
| 6.25 | 0.029 –0.032 | 21 | 96.4 |

Accordingly, I prefer to use quantities of promoter ranging between about 0.016 part and 1 part of iron metal per 100 parts of fumaric acid.

The conversion of fumaric acid to fumaryl chloride by reaction with thionyl chloride can be accelerated by increasing the concentration of promoter substance in the reacting mass, but increasing amounts appear to promote side reactions also which result in lowering the yield of fumaryl chloride. Thus in a group of experiments in each of which a mixture of 6.44 parts by weight of thionyl chloride and 1 part by weight of fumaric acid was refluxed in one case without promoter, and in the others with contents of ferric chloride adjusted to points above the threshold value for iron, it was found that without the promoter substance in the mixture no reaction took place in more than 60 hours of refluxing, while with the promoter substance in greater concentration than the threshold value, the reaction was completed in much less time, but the yield of fumaryl chloride was reduced as indicated in the following Table II.

Table II

| Promoter | | | Reaction Period required to complete reaction (hours) | Yield of Fumaryl Chloride (percent theory) |
| --- | --- | --- | --- | --- |
| Name | Percent by Weight of Reaction Mixture | Parts Fe per 100 parts Fumaric Acid | | |
| None | | | more than 60 | 0 |
| FeCl$_3$ | 0.0077 | 0.0197 | 15 | 93 |
| FeCl$_3$ | 0.135 | 0.344 | 3 | 85 |

Since the metal, or the portion thereof in a promoter compound of the metal appears to be responsible for the promoting action, when reference is made in the claims to an "iron promoter" I intend to include thereby iron in metallic form and in the form of its compounds.

The promoter substance may be incorporated in the reaction mixture in any desired manner, either with the thionyl chloride or with the fumaric acid, or simultaneously with both. Technical grades of thionyl chloride, for example, material which has been stored in iron containers, and often containing iron as an impurity, may be used. The amount of iron in a thionyl chloride-fumaric acid mixture may be adjusted by using either an amount of technical thionyl chloride which provides the required amount of iron promoter, or by adding iron promoter to the mixture to make up any deficiency of promoter.

In general, unreacted thionyl chloride recovered by distillation for reuse usually contains insufficient iron to promote reaction between the recovered chloride and fumaric acid, and accordingly, when recovered thionyl chloride is used the reaction mixture should be fortified with additional promoter.

The following examples will serve further to illustrate my invention. In the examples parts are given by weight, except as otherwise indicated.

*Example 1.*—174 parts of fumaric acid and 1120 parts of distilled thionyl chloride were charged to a glass reaction vessel provided with a vertical, water-cooled glass reflux condenser. Then 1.74 parts of anhydrous ferric chloride were added and the contents were refluxed under atmospheric pressure. Thionyl chloride thus vaporized was condensed and returned to the reaction mass by the reflux condenser, while HCl and SO$_2$ generated in the reaction passed through and were conducted to a water absorber. At the end of three hours the particles of solid fumaric acid had completely dissolved, indicating that the reaction was complete. The reaction mass was then transferred to a glass still and fractionally distilled under atmospheric pressure. Material boiling from 68° to 80° C. was collected separately as a first fraction. It amounted to 698 parts and consisted essentially of thionyl chloride suitable for reuse in the process. Material boiling from 80° to 153° C. was collected as a second fraction, and amounted to 13 parts. Distillate collected from 153° to 160° C. as a third fraction amounted to 190 parts, and consisted essentially of fumaryl chloride. Non-distillable residue in the still amounted to 22 parts. The second fraction was fractionally distilled and the portion thereof boiling above 153° C. was added to the third fraction to provide a total of 196.7 parts of material consisting essentially of fumaryl chloride and corresponding to 85.3% of the theoretical yield of fumaryl chloride. The material on analysis showed a chlorine content of 45.0% as compared to a theoretical value of 46.36% for this compound and a specific gravity at 20°/20° of 1.4125.

When the ferric chloride was omitted, no reaction was noted, and the fumaric acid was not dissolved even after refluxing the mixture for 18 hours.

*Example 2.*—A mixture of 174 parts of fumaric acid, 1120 parts of distilled thionyl chloride and 0.3 part of steel shavings was refluxed under atmospheric pressure for 3½ hours, at the end of which time the solid fumaric acid had disappeared completely. The reaction mass was then fractionally distilled in the foregoing manner as follows:

First fraction (73–80° C.) = 698 parts
Second fraction (80–153° C.) = 36 parts
Third fraction (153–159° C.) = 188 parts
Residue = 17 parts The third fraction, and 18.5 additional parts boiling from 153° to 157° C. recovered from the second fraction by refractionation, together formed 206.5 parts of material consisting essentially of fumaryl chloride and corresponding to 89.9% of the theoretical yield of fumaryl chloride.

*Example 3.*—A mixture of 174 parts of fumaric acid, 1120 parts of distilled thionyl chloride and 0.1 part of $FeCl_2.4H_2O$ was refluxed under atmospheric pressure for 10½ hours. The reaction mixture was then fractionally distilled in the manner described in Example 1 as follows:

First fraction (74–81° C.) = 689 parts
Second fraction (81–153° C.) = 8 parts
Third fraction (153–161° C.) = 208 parts
Residue = 9 parts The third fraction and 4.1 parts boiling from 153° to 157° C. recovered from the second fraction, formed a total yield of 212.1 parts of material consisting essentially of fumaryl chloride and corresponding to a yield of 92.4% of the theoretical yield of fumaryl chloride.

By employing 0.1 part of anhydrous ferric chloride in place of hydrated ferrous chloride, refluxing for 14½ hours, and fractionating the reaction mass in similar manner, 212.7 parts of material consisting essentially of fumaryl chloride (205 parts as third cut and 7.7 parts by refractionation of the second fraction) were obtained, and corresponded to a yield of 92.7% of the theoretical yield of fumaryl chloride.

*Example 4.*—A mixture of 87 parts of fumaric acid, 560 parts of distilled thionyl chloride, and 1.49 parts of hydrated ferrous sulfate $$(FeSO_4.7H_2O)$$

was refluxed in glass for 22 hours under atmospheric pressure. The solid fumaric acid dissolved or disappeared for the most part within 4 hours, and was completely gone after 22 hours. The reaction mass was then fractionated under atmospheric pressure in a glass still provided with a good fractionating column. Material boiling below 79° C. represented recovered thionyl chloride, and was collected separately as a first fraction amounting to 315 parts. Distillate collected between 154° and 164° C., representing material consisting essentially of fumaryl chloride, was collected as a second fraction, which amounted to 98 parts corresponding to 85% of the theoretical yield of fumaryl chloride. No distillate was obtained between 79° and 154° C., and at the end of the distillation, 16 parts of tarry residue remained in the still.

While the above describes the preferred embodiments of my invention, it will be understood that departures may be made therefrom within the scope of the specification and claims.

I claim:

1. In a process for preparing fumaryl chloride the step which comprises heating a mixture of fumaric acid and thionyl chloride in the presence of an iron promoter.

2. The process as defined in claim 1, wherein the weight ratio of thionyl chloride to fumaric acid is at least about 2.5 to 1.

3. The process defined in claim 2, wherein the heating is effected under reflux conditions at atmospheric pressure until the reaction is substantially complete.

4. The process of claim 1, wherein the iron promoter is present in an amount corresponding to between 0.016 part and one part of iron per 100 parts of fumaric acid used.

5. The process of claim 2, wherein the iron promoter is present in an amount corresponding to between 0.016 part and one part of iron per 100 parts of fumaric acid used.

6. The process of claim 3, wherein the iron promoter is present in an amount corresponding to between 0.016 part and one part of iron per 100 parts of fumaric acid used.

7. The process according to claim 2, wherein the promoter is an iron chloride promoter and is present in an amount corresponding to between 0.016 part and one part of iron per 100 parts of fumaric acid used.

8. The process according to claim 2, wherein the promoter is metallic iron and is present in an amount corresponding to between 0.016 part and one part of iron per 100 parts of fumaric acid used.

SYDNEY M. SPATZ.

References Cited in the file of this patent

FOREIGN PATENTS

| Number | Country | Date |
|---|---|---|
| 465,038 | Great Britain | Apr. 22, 1937 |
| 701,953 | Germany | Jan. 27, 1941 |

OTHER REFERENCES

Meyer, Monatschafte, vol. 22 (1901), pp. 415–442.